(12) United States Patent
DeCusatis et al.

(10) Patent No.: US 9,176,899 B2
(45) Date of Patent: *Nov. 3, 2015

(54) COMMUNICATION PROTOCOL PLACEMENT INTO SWITCH MEMORY

(71) Applicant: International Business Machines Corporation, Armonk, NY (US)

(72) Inventors: Casimer M. DeCusatis, Poughkeepsie, NY (US); Rajaram B. Krishnamurthy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 495 days.

This patent is subject to a terminal disclaimer.

(21) Appl. No.: 13/720,159

(22) Filed: Dec. 19, 2012

(65) Prior Publication Data

US 2014/0173014 A1   Jun. 19, 2014

(51) Int. Cl.
*G06F 15/167* (2006.01)
*G06F 13/00* (2006.01)
*H04L 12/64* (2006.01)

(52) U.S. Cl.
CPC ............ *G06F 13/00* (2013.01); *H04L 12/6418* (2013.01)

(58) Field of Classification Search
CPC ... G06F 15/17331; G06F 13/00; G06F 13/28; H04L 12/6402; H04L 12/66
See application file for complete search history.

(56) References Cited

U.S. PATENT DOCUMENTS

| 4,679,189 | A  | * | 7/1987  | Olson et al. ................... 370/396 |
| 7,031,904 | B1 | * | 4/2006  | Wilson et al. ................. 709/230 |
| 7,480,303 | B1 | * | 1/2009  | Ngai .......................... 370/395.5 |
| 2003/0091021 | A1 |   | 5/2003  | Trossen et al. |
| 2004/0237110 | A1 | * | 11/2004 | Jones, Jr. ......................... 725/74 |
| 2005/0188129 | A1 |   | 8/2005  | Abdelilah et al. |
| 2005/0213599 | A1 |   | 9/2005  | Clawson |
| 2006/0067346 | A1 | * | 3/2006  | Tucker et al. ................. 370/412 |
| 2007/0201434 | A1 | * | 8/2007  | Nakamura et al. ............ 370/352 |
| 2007/0230470 | A1 |   | 10/2007 | Mahamuni |
| 2013/0138836 | A1 | * | 5/2013  | Cohen et al. .................. 709/250 |

FOREIGN PATENT DOCUMENTS

| EP | 2071765 A1 | 6/2009 |
| JP | 2004194104 A1 | 7/2004 |
| WO | WO2005099375 A2 | 10/2005 |

* cited by examiner

*Primary Examiner* — Jonathan Bui
(74) *Attorney, Agent, or Firm* — Steven Chiu

(57) ABSTRACT

Direct memory transfer of data from the memory of a server to a memory of a switch. A server identifies a block of data in the memory of the server and a corresponding memory address space in the server. The server identifies a block of memory in the switch. The block of memory is at least the same size of the block of data. The switch comprises a network protocol. The server transfers the block of data into the block of memory. Based on the network protocol, the switch maps a network relationship. The mapping indicates a target server for the transferred block of data to be transmitted to.

12 Claims, 5 Drawing Sheets

US 9,176,899 B2

COMMUNICATION PROTOCOL PLACEMENT INTO SWITCH MEMORY

BACKGROUND

The present invention relates, in general, to data transfer across networks, and in particular, to direct memory transfer of data from server memory to switch memory.

Modern computer data centers employ several different types of networks, for example InfiniBand, Ethernet, Fibre Channel over Ethernet (FCoE), etc. These networks require protocol specific network interface controllers (NICs) or host bus adapters (HBAs) at the server. The network itself requires protocol specific switches, which are arranged in a multi-tier hierarchy and includes access or edge switches, larger capacity aggregation switches, and core switches. Additional equipment may be required, depending on the hierarchy, for example in hierarchies of 4, 5, or more tiers. In addition to the NIC at either end of each link, each switch adds latency to the network. Congestion in large networks, which may result from oversubscription, further increases latency and reduces available network bandwidth.

BRIEF SUMMARY

According to one embodiment of the present invention, a method, system, and program product is provided for direct memory transfer of data from the memory of a server to a memory of a switch. A server identifies a block of data in the memory of the server and a corresponding memory address space in the server. The server identifies a block of memory in the switch. The block of memory is at least the same size of the block of data. The switch comprises a network protocol. The server transfers the block of data into the block of memory. Based on the network protocol, the switch maps a network relationship. The mapping indicates a target server for the transferred block of data to be transmitted to.

According to one embodiment of the present invention, based on the network relationship mapping, the switch transfers the block of data to the target server.

According to one embodiment of the present invention, the switch comprises a switch address space. The switch address space comprises the block of memory.

According to one embodiment of the present invention, the network protocol comprises a network address assignment between a physical, link and a routing layer of the network fabric.

According to one embodiment of the present invention, the switch comprises a forwarding database. The forwarding database comprises the network protocol.

According to one embodiment of the present invention the network protocol is determined based on a deep packet inspection by the switch.

According to one embodiment of the present invention, the transfer of the block of data occurs via direct memory access directly into and out of said buffer in the switch.

According to one embodiment of the present invention the switch shares the network relationship mapping with another switch.

According to one embodiment of the present invention the transferred block of data is sent through a fixed length cell.

According to one embodiment of the present invention, transferring the block of data comprises transferring the block of data into a buffer associated with the block of memory.

DETAILED DESCRIPTION

In accordance with an embodiment, a method, system, and computer program product is provided for data transfer across networks, in particular to direct memory transfer of data from server memory to switch memory. An embodiment of the present invention may be compatible with industry standard 802.1gab implementations, network virtualization, and a variety of networks including Ethernet and Fibre Channel. The term data and information may be used interchangeably throughout the specification. The term core and switch may be used interchangeably throughout the specification.

In a typical data center network, data is encapsulated into the payload of an Ethernet frame and transmitted from the server through a protocol specific NIC to a hierarchy of switches. In one embodiment of one or more aspects of the present invention, data intended for server-to-server communication may be directly transferred from server data buffers into core layer network equipment buffers that interface with the core switch backplane. The data may flow directly from the server to the core switches, and then back to another server, without the need for access or aggregation layer switches or protocol specific NICs. In one embodiment, networks, including both packet and cell based networks, may be utilized. A cell is defined to be an Ethernet packet with a fixed length. In one embodiment, overlay network standards, such as Distributed Overlay Virtual Ethernet (DOVE), Virtual Extensible Local Area Network (VXLAN), and Network Virtualization using Generic Routing Encapsulation (NVGRE), and other vendor proprietary overlays, such as FabricPath, Qfabric, VCS, etc., may also be utilized. Direct peripheral component interconnect express (PCIe) bus attachments in enterprise servers and hybrid architectures may also be utilized, as well as applications on symmetric multiprocessing (SMP) buses in high performance computing.

One embodiment of the present invention may be done through software only modifications of the server and the switch. In other words, NIC functions in hardware may be eliminated and replaced with an equivalent virtualized SW. Another embodiment of the present invention may be done through hardware, as discussed further in FIG. 5.

Figure 1:
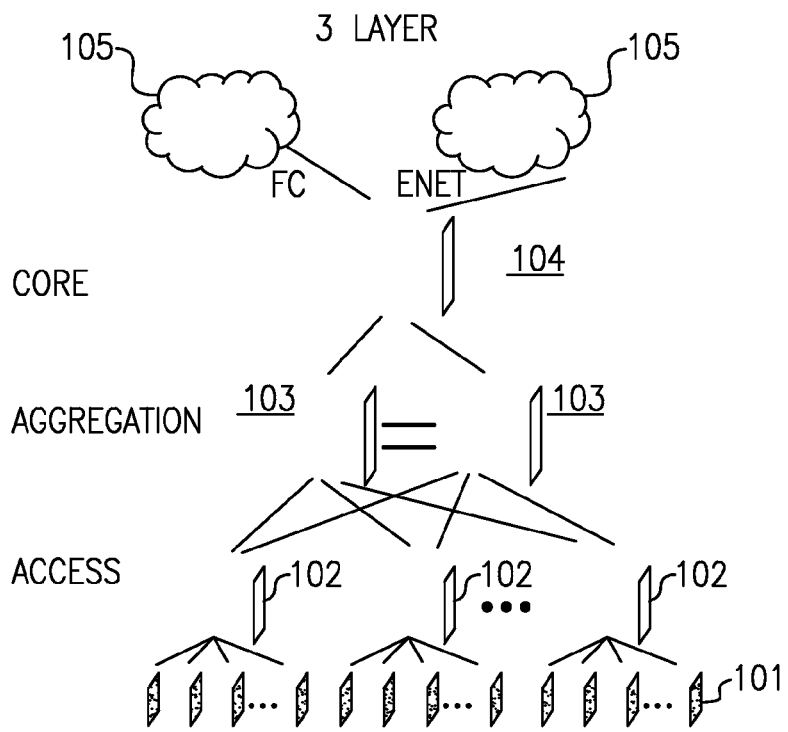
FIG. 1 illustrates one embodiment of a 3 layer computer network.

One embodiment of a 3 layer computer network is described in reference to FIG. 1. Multiple computer systems 101 are connected to various access devices 102. The access devices may comprise access layer switches, also known as a top of rack (TOR), that interconnect the computer systems 101. These access devices 102 are connected to aggregation devices 103, which act to interconnect the access devices 102. The aggregation devices 130 are connected to a core device 104 which interconnects the aggregation devices 103 and facilitates connections between the computer systems 101. The core 104 is connected to one or more networks 105, such as a Fibre Channel or Ethernet.

Figure 2:
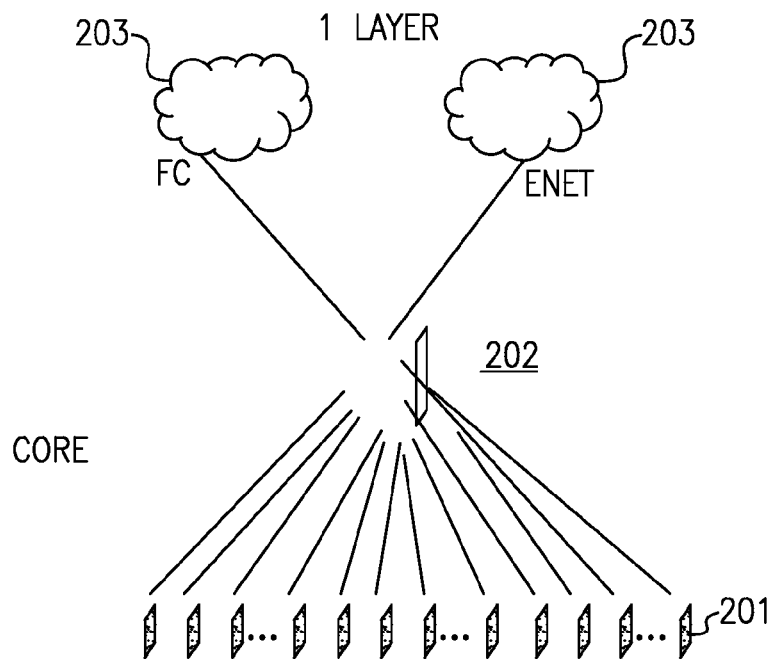
FIG. 2 illustrates one embodiment of a single layer computer network in accordance with one or more aspects of the present invention.

One embodiment of a single layer computer network in accordance with one or more aspects of the present invention is described with reference to FIG. 2. One or more computer systems 201 may be connected to a core device 202. The core device 202 may comprise a buffer for holding transaction data. The core 202 may also comprise a database containing data transmission information, such as internet protocol (IP) and media access control (MAC) address tables, and other protocols to resolve network address assignments between physical, link, and routing layers of the network fabric. Protocols may refer to network protocols that are well known in the art, such as the Address Resolution Protocol (ARP) and the Rapid Spanning Tree Protocol (RSTP). ARP is further described in "An Ethernet Address Resolution Protocol— or—Converting Network Protocol Addresses to 48.bit Ethernet Address for Transmission on Ethernet Hardware" by David C. Plummer, published in November 1982, incorporated herein by reference. RSTP and other protocols are further described in "802.1D IEEE Standard for Local and metropolitan area networks Media Access Control (MAC) Bridges" published in 2004, reference number IEEE Std 802.1D—2004, incorporated herein by reference. The core 202 may be connected to one or more networks 203, such as Fibre Channel or Ethernet.

Figure 3:
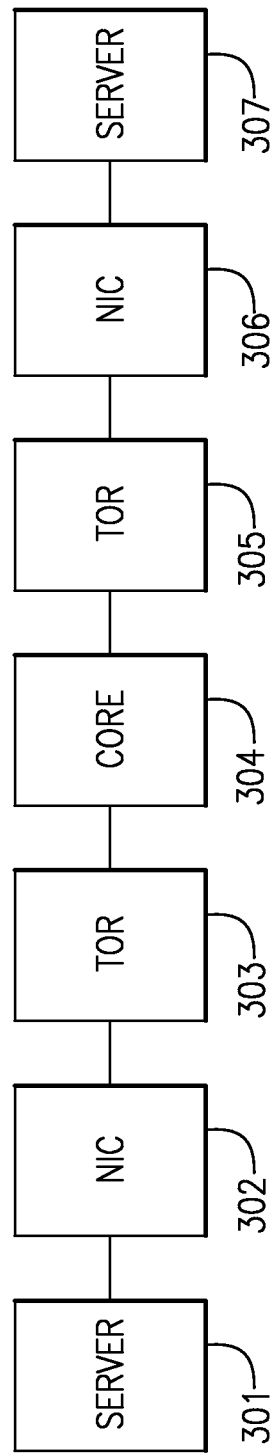
FIG. 3 illustrates one embodiment of a network.

One embodiment of a network is described in reference to FIG. 3. A first server 301 is connected to a first NIC 302, for example through a PCIe bus. The NIC 302, 306 allows computers to communicate across a network and to transfer data across the network. The NIC 302, 306 handles network relationships, such as Ethernet to IP binding relationships, i.e. an Address Resolution Protocol (ARP), uniform resource locator (URL) mappings, network address assignments, and other higher level associations which may include mapping to layer 4-7 protocols.

One of the main purposes of a NIC 302, 306, is to uniquely identify a node, such as the first server 301 and the second 307, on the network at the data link layer (layer 2). The higher protocol layers, such as the IP layer, associates itself to the MAC address in Ethernet networks, or the world wide (WW) port name in Fibre Channel networks. There may be other associations depending on the network type.

The first NIC 302 is connected to a first TOR 303, for example through Ethernet. The first TOR 303 is connected to the Core 304, for example through Ethernet. The Core 304 may receive and send data as a cell. The Core 304 is connected to a second TOR 305, for example through Ethernet. The second TOR 305 is connected to a second NIC 306, for example through Ethernet. The second NIC 306 is connected to a second server, for example through PCIe.

Figure 4:
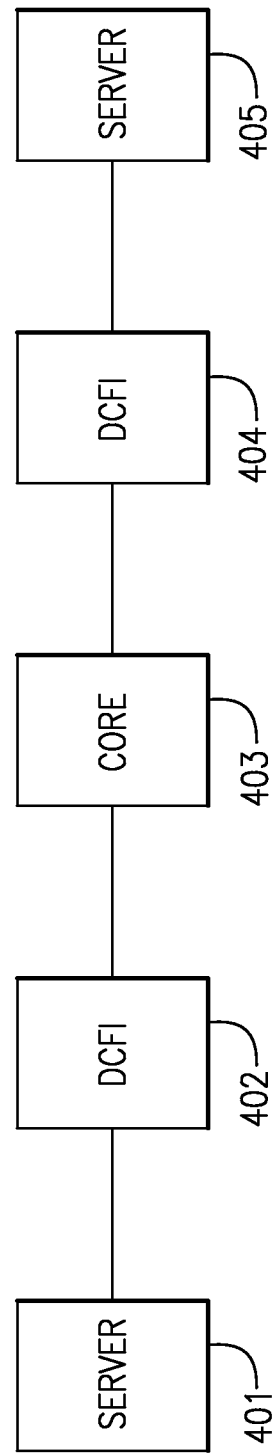
FIG. 4 illustrates one embodiment of a network in accordance with one or more aspects of the present invention.

One embodiment of a network in accordance with one or more aspects of the present invention is described in reference to FIG. 4. A first server 401 uses a first Data Center Fabric Interface (DCFI) 402. The DCFI 402, 404 allows the servers 401, 405 to transfer data directly to the Core without the use of a NIC, such as NIC 302, 306 in FIG. 3. In one embodiment, the DCFI 402, 404 may be implemented in software and may be located on the servers 401, 405. In another embodiment, the DCFI 402, 404 may be implemented in hardware, and may be physically located on the servers 401, 405. The DCFI 402, 404 may deal with mapping PCIe data into a cell-based network and vice versa. The mapping depends on the type of cell network. The DCFI may deal with PCI or PCIe of various standards, for example PCIe Gen 3 described in the PCIe base spec, which may be found in "PCI Express® Base Specification Revision 3.0 Version 0.9" published Aug. 10, 2010, incorporated herein by reference. The first Server 401, through the first DCFI 402, is connected to the Core 403. The Core 403 may handle various NIC functionalities such as network relationships, for example Ethernet to IP binding relationships such as ARP. The Core 403 is connected to the second DCFI 404 located in the second Server 405. In one embodiment, the Core 403 may be directly connected to an input output (IO) drawer, cage, or other subsystem on a server 401, 405 or server like storage.

In one embodiment, the Core 403 may handle NIC functions such as ARP relationships through forwarding databases through enabled switch ports. These forwarding databases may be stored in memory on the Core. The handling of the forwarding databases may be similar to the handling of Management Datagram Forwarding Databases (MAD FDB). Management of Datagrams are described in "Management Information Base for the User Datagram Protocol" by B. Fenner, published in June 2005, incorporated herein by reference. The forwarding databases may be tables containing information relating to network relationships, for example an IP to MAC relationship, URL mappings, and other higher level associations. The network relationship information may be obtained by a switch when it is connected to the rest of the network, or it may be preloaded by a network administrator. In one embodiment the Core 403 application-specific integrated circuit (ASIC) may be logically separated into two different partitions via software. One partition would perform traditional switching functions, while the other partition would maintain the network relationships, for example the MAC to IP mapping. As a result, applications in the server 401, 405 may no longer require knowledge of the MAC for Ethernet, world wide (WW) port names for Fibre Channel, and IP information.

In one embodiment, the network relationships may be discovered automatically through deep packet inspection in the ASICs within the switch or within related networking appliances, such as a load balancer or a firewall. When the ASIC conducts a deep packet inspection, it opens the packets and inspects the contents based on certain screening criteria. For example, deep packet inspection is typically used to check against known viruses. In one embodiment, deep packet inspection is used to ascertain the networking relationship by extracting networking information such as the IP and MAC address.

Figure 5:
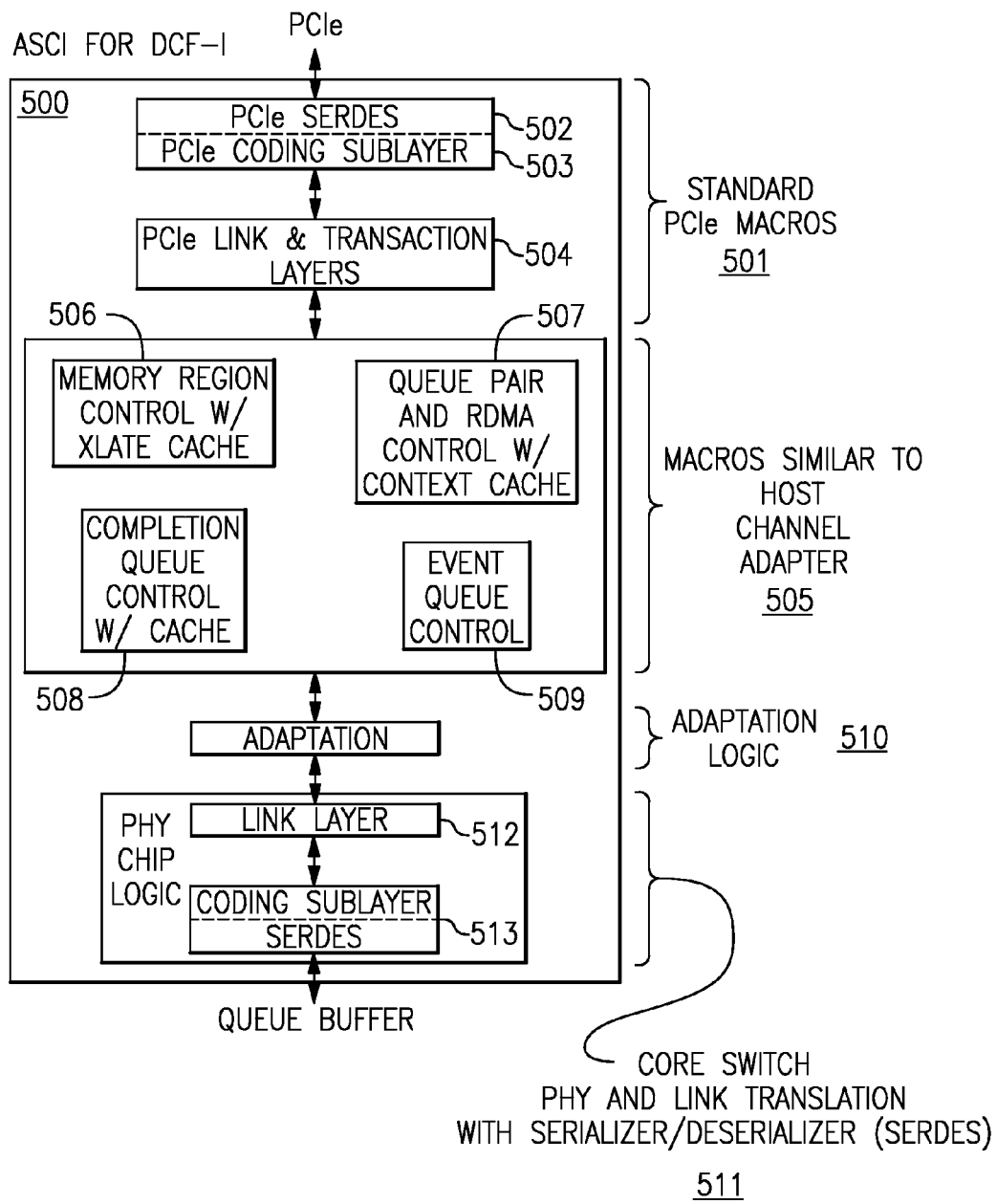
FIG. 5 illustrates one embodiment of a hardware implementation of DCFI in accordance with one or more aspects of the present invention.

One embodiment of a hardware implementation of DCFI in accordance with one or more aspects of the present invention is described in reference to FIG. 5. The DCFI may be implemented in an ASIC 500. It may include a host interface to a PCIe network, for example a PCIe Gen 3 network. It may include hardware for standard PCIe Macros 501, which are standard PCIe code that combines several PCIe commands together, such as a PCIe serial/deserializer (SERDES) 502 and a PCIe Link and Transaction Layer 504. The SERDES 502 converts parallel data streams into serial data streams and vice versa. This allows data to be mapped from a backplane PCIe bus into a serial link for long distance transmissions. The PCIe Link and Transaction Layer 504 are the lower layers of the PCIe networking model. They package data into frames compatible with the physical layer being used. The PCIe SERDES may contain a PCIe coding sublayer 503, which is an optional layer that can encode data, which may be used for security reasons. The hardware for standard PCIe Macros 501 may be connected to hardware for Macros similar to the Host Channel Adapter 505, such as a Memory Region Control with Xlate Cache 506, Queue Pair and RDMA control with Context Cache 507, Completion Queue Control with Cache 508, and Event Queue Control 509. Memory Region Control with Xlate Cahce 506 is a URL translator which takes a URL from a web site address and translates it into the numerical IP address of the appropriate web server. Queue Pair and RDMA control with Context Cache 507 controls how data is read from the input/output (I/O) queue into the memory of the attached server. Completion Queue Control with Cache 508 is further described in "Completion Queue Management Mechanism and Method for Checking on Multiple Completion Queues and Processing Completion Events", by Jerrie Coffman et al, U.S. Pat. No. 6,718,370, incorporated herein by reference. Event Queue Control 509 is further described in "Interrupt management for multiple event queues", by Steve Pope et al, WO2005074611A2, incorporated herein by reference. This hardware for Macros similar to the Host Channel Adapter 505 may be connected to Adaptation Logic hardware 510. The Host channel Adapter may be for example a NIC. The NIC typically has logic associated with its hardware that defines its functionality. The Adaptation Logic hardware 510 may be connected to hardware for Core Switch PHY and LINK Translation with SERDES 511, such as a Link Layer 512 (which is the layer where data packets are encoded and decoded into bits and which provides transmission protocol knowledge and management, physical layer error handling, flow control and frame synchronization) and a Coding Sub-layer 513 (which performs data encoding/decoding such as for the 8b/10b encoding usually done on raw data). The output of the hardware for Core Switch PHY and LINK Translation with SERDES 511 may be directed towards a queue buffer, which may be located in the switch.

Figure 6:
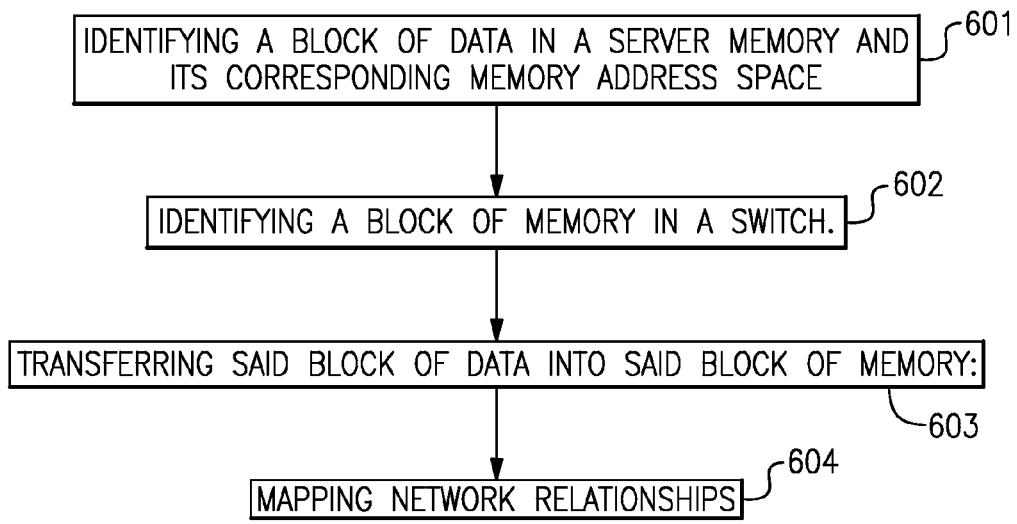
FIG. 6 illustrates one embodiment of a process in accordance with one or more aspects of the present invention.

One embodiment of a process in accordance in accordance with one or more aspects of the present invention is described in reference to FIG. 6. A transmitting server wishes to transfer data, such as a block of data, to a target server. A block of data in the memory of a transmitting server and its corresponding memory address space in the transmitting server is identified by the transmitting server, 601. A block of memory is identified in a switch by the transmitting server 602. The switch block of memory may be associated with a switch address space. The switch address space may contain the switch block of memory. The identified switch block of memory may be large enough to accommodate the block of data identified by the transmitting server. In one embodiment, the switch may comprise memory large enough to hold multiple blocks of data from one or more transmitting servers. In one embodiment, the switch may comprise a database, such as a forwarding database. The database may comprise network protocols used to resolve network relationships, for example Ethernet to internet protocol (IP) binding relationships, i.e. ARP, URL mappings, network address assignments, and other higher level associations. In another embodiment, a network protocol may be established by the switch based on deep packet inspection.

The block of data in the transmitting server is transferred to the block of memory in the switch by the transmitting server, 603. In one embodiment, the block of data in the transmitting server is transmitted to a buffer in the switch, where the buffer is associated with the block of memory in the switch. Network relationships may be mapped by the switch, 605. These network relationships are mapped based on the protocols stored on the switch. Subsequently, based on the mapping, the switch may transfer the block of data in the switch to the target server.

In one embodiment, the switch shares its resolved network relationships, i.e. URL mapping, the higher level associations, etc., and shares it with other switches located in the network. In one embodiment, for Fibre Channel or FCoE networks, resolved relationships, i.e. worldwide port name associations, are shared with other switches.

In one embodiment, the data transferred from a transferring system, i.e. system data, may be available via direct memory access (DMA) directly into and out of buffers in the switch. The buffers may be located directly in the switch or may be interfaced to the backplane of the switch. In one embodiment, the data transferred may be from a storage device which interfaces PCIe directly to the switch. In one embodiment, the data transferred may be from a PCIe Input/Output (I/O) cage which interfaces PCIe directly to the switch.

In one embodiment, the server may be modified to adapt the data from a PCIe bus directly into a memory location for DMA access. The server may map the data by assigning it into the requested DMA memory slots. The data traffic that results from such an adaptation may be sent through a fixed length cell format, which is different from standard Ethernet packets. Standard Ethernet packets are typically variable in length and depend on the amount of data used in the payload.

As will be appreciated by one skilled in the art, the embodiments may be embodied as a system, method or computer program product. Accordingly, the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiment may take the form of a computer program product embodied in any tangible medium of expression having computer usable program code embodied in the medium.

Figure 7:
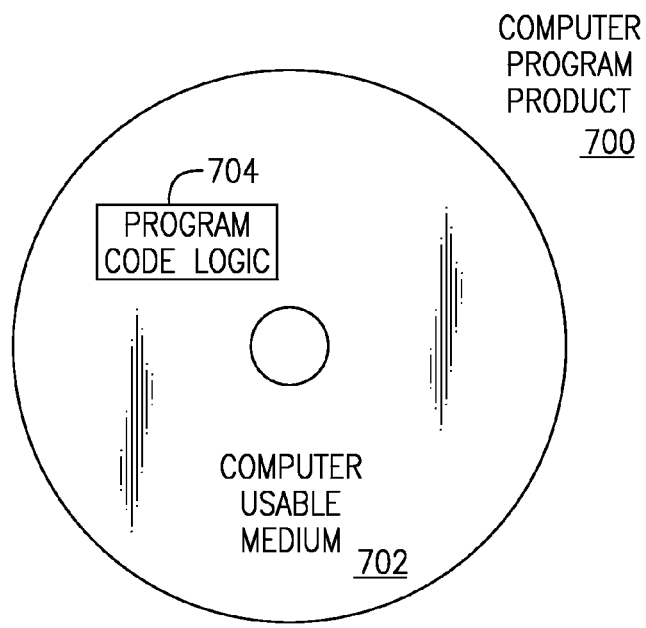
FIG. 7 illustrates one embodiment of a computer program product to incorporate one or more aspects of the present invention.

One example of a computer program product incorporating one or more aspects of an embodiment is described with reference to FIG. 7. A computer program product 700 includes, for instance, one or more computer usable media 702 to store computer readable program code means or logic 704 thereon to provide and facilitate one or more aspects of an embodiment. Any combination of one or more computer usable or computer readable medium(s) may be utilized. The computer-usable or computer-readable medium may be, for example but not limited to, an electronic, magnetic, optical, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable medium may be any storage medium that can contain or store the program for use by or in connection with the instruction execution system, apparatus, or device.

Computer program code for carrying out operations of the embodiment may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
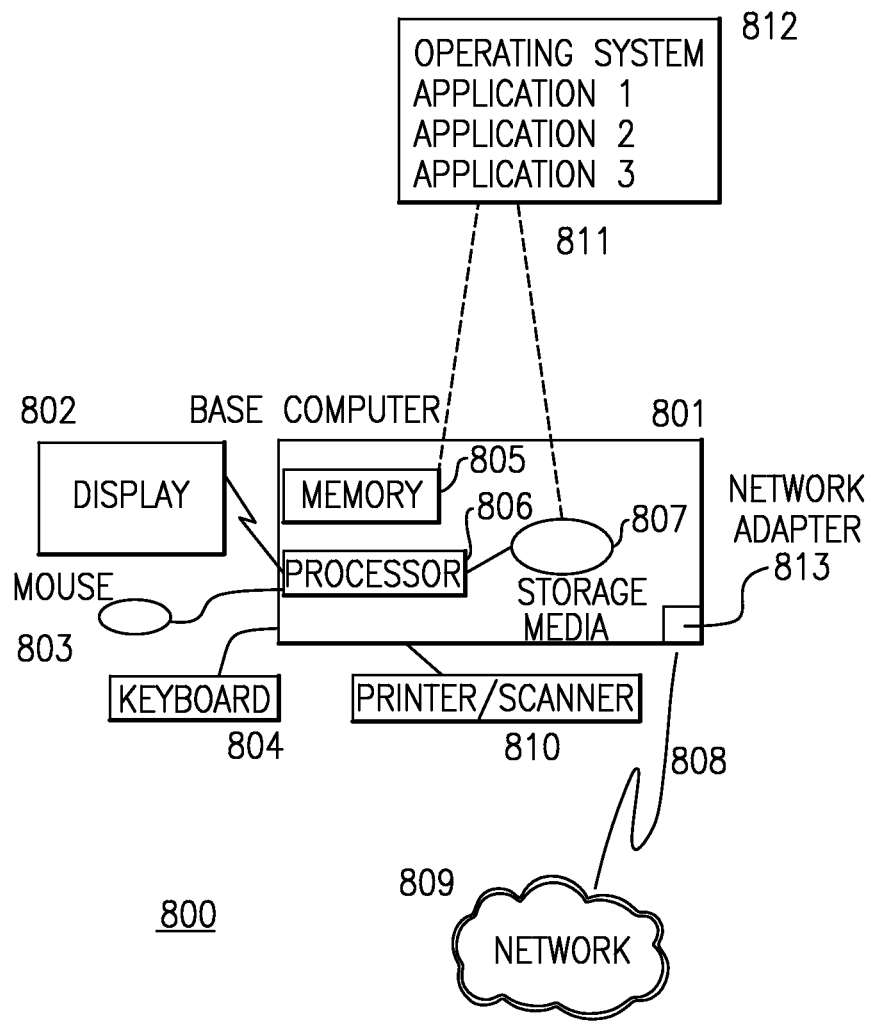
FIG. 8 illustrates one embodiment of a computer system in which an embodiment of the present invention may be practiced.

FIG. 8 illustrates an embodiment of a workstation, server hardware system, in which an embodiment may be practiced. The system comprises a computer system 801, such as a personal computer, a workstation, a server, a storage device, or host, including optional peripheral devices. The computer system 801 includes one or more processors 806 and a bus employed to connect and enable communication between the processor(s) 806 and the other components of the computer system 801 in accordance with known techniques. The bus connects the processor 806 to memory 805 and long-term storage 807 which can include a hard drive (including any of magnetic media, CD, DVD and Flash Memory for example) or a tape drive for example. The computer system 801 might also include a user interface adapter, which connects the microprocessor 806 via the bus to one or more interface devices, such as a keyboard 804, mouse 803, a printer/scanner 810 and/or other interface devices, which can be any user interface device, such as a touch sensitive screen, digitized entry pad, etc. The bus also connects a display device 802, such as an LCD screen or monitor, to the microprocessor 806 via a display adapter.

The computer system 801 may communicate with other computers or networks of computers by way of a network adapter 813, for example NIC, capable of communicating 808 with a network 809. For example, network adapters may include communications channels, token ring, Ethernet or modems. Alternatively, the computer system 801 may communicate using a wireless interface, such as a CDPD (cellular digital packet data) card. The computer system 801 may be associated with such other computers in a Local Area Network (LAN), VLAN, or a Wide Area Network (WAN), or the computer system 801 may be a client in a client/server arrangement with another computer, etc. All of these configurations, as well as the appropriate communications hardware and software, are known in the art.

Software programming code which embodies an embodiment may be typically accessed by the processor 806 from long-term storage media 807. The software programming code may be embodied on any of a variety of known media for use with a data processing system, as previously described above with reference to FIG. 7. The code may be distributed on such media, or may be distributed to users from the memory or storage of one computer system over a network to other computer systems.

Alternatively, the programming code 811 may be embodied in the memory 805, and accessed by the processor 806 using the processor bus. Such programming code may include an operating system which controls the function and interaction of the various computer components and one or more application programs 812. Program code may be normally paged from storage media 807 to memory 805 where it may be available for processing by the processor 806. The techniques and methods for embodying software programming code in memory, on physical media, and/or distributing software code via networks are well known and will not be further discussed herein. The computer program product medium may be typically readable by a processing circuit preferably in a computer system for execution by the processing circuit.

The flow diagrams depicted herein are just examples. There may be many variations to these diagrams or the steps (or operations) described therein without departing from the spirit of the embodiment. For instance, the steps may be performed in a differing order, or steps may be added, deleted or modified. All of these variations are considered a part of the claimed embodiment.

While the preferred embodiment has been described, it will be understood that those skilled in the art, both now and in the future, may make various improvements and enhancements which fall within the scope of the claims which follow.

What is claimed is:

1. A computer system comprising:
a memory;
a processor in communication with said memory, said processor fetching instructions from the memory and executing the fetched instructions;
wherein said computer system performs a method comprising:
identifying a block of data in said memory and a corresponding memory address space;
identifying a block of memory in a switch, said block of memory being at least the same size of said block of data, said switch comprising a network protocol;
transferring said block of data into said block of memory;
based on said network protocol, mapping, by said switch, a network relationship, said mapping to indicate a target server for said transferred block of data to be transmitted to; and
based on said network relationship mapping, transferring said block of data to said target server.

2. The computer system according to claim 1, wherein said switch comprises a switch address space, said switch address space comprising said block of memory.

3. The computer system according to claim 1, wherein said network protocol comprises a network address assignment between a physical, link and a routing layer of the network fabric.

4. The computer system according to claim 1, wherein said switch comprises a forwarding database, said forwarding database comprising said network protocol.

5. The computer system according to claim 1, wherein said network protocol is determined based on a deep packet inspection by said switch.

6. The computer system according to claim 1, wherein said transferred block of data is sent through a fixed length cell.

7. A computer program product, the computer program product comprising:
- a computer readable storage device storing instructions for execution by a processing circuit for performing a method comprising:
  - identifying a block of data in said memory and a corresponding memory address space;
  - identifying a block of memory in a switch, said block of memory being at least the same size of said block of data, said switch comprising a network protocol;
  - transferring said block of data into said block of memory; and
  - based on said network protocol, mapping, by said switch, a network relationship, said mapping to indicate a target server for said transferred block of data to be transmitted to; and
  - based on said network relationship mapping, transferring said block of data to said target server.

8. The computer system according to claim 7, wherein said switch comprises a switch address space, said switch address space comprising said block of memory.

9. The computer system according to claim 7, wherein said network protocol comprises a network address assignment between a physical, link and a routing layer of the network fabric.

10. The computer system according to claim 7, wherein said switch comprises a forwarding database, said forwarding database comprising said network protocol.

11. The computer system according to claim 7, wherein said network protocol is determined based on a deep packet inspection by said switch.

12. The computer system according to claim 7, wherein said transferred block of data is sent through a fixed length cell.

* * * * *